United States Patent
Natsume et al.

(10) Patent No.: US 8,109,103 B2
(45) Date of Patent: Feb. 7, 2012

(54) LOAD DRIVING DEVICE, OUTDOOR UNIT OF AIR CONDITIONER, AND DRIVING METHOD OF LOAD

(75) Inventors: Morikuni Natsume, Osaka (JP); Satoshi Yagi, Osaka (JP); Takuya Kotani, Osaka (JP); Yasuaki Miyaba, Osaka (JP); Hirotaka Saruwatari, Osaka (JP); Hiroyuki Matsuura, Osaka (JP); Mario Hayashi, Osaka (JP)

(73) Assignee: Daikin Industries, Ltd., Osaka-Shi (JP)

( * ) Notice: Subject to any disclaimer, the term of this patent is extended or adjusted under 35 U.S.C. 154(b) by 657 days.

(21) Appl. No.: 12/224,089

(22) PCT Filed: Mar. 2, 2007

(86) PCT No.: PCT/JP2007/054022
§ 371 (c)(1),
(2), (4) Date: Aug. 18, 2008

(87) PCT Pub. No.: WO2007/102423
PCT Pub. Date: Sep. 13, 2007

(65) Prior Publication Data
US 2009/0007579 A1    Jan. 8, 2009

(30) Foreign Application Priority Data

Mar. 8, 2006  (JP) ................... 2006-062134
Aug. 30, 2006  (JP) ................... 2006-233758

(51) Int. Cl.
*F25B 49/00* (2006.01)
*F25B 1/00* (2006.01)
*H02P 1/26* (2006.01)
*H02P 27/00* (2006.01)

(52) U.S. Cl. ............ 62/126; 62/228.1; 62/230; 318/766; 318/818

(58) Field of Classification Search ............... 62/228.1, 62/126, 130, 236, 230; 318/818, 819, 766
See application file for complete search history.

(56) References Cited

FOREIGN PATENT DOCUMENTS

| JP | 11-211253 A | 8/1999 |
|---|---|---|
| JP | 11-311436 A | 11/1999 |
| JP | 11-325545 A | 11/1999 |
| JP | 2000-205627 A | 7/2000 |
| JP | 2000-333365 A | 11/2000 |
| JP | 2000-346425 A | 12/2000 |
| KR | 10-2005-0055452 A | 6/2005 |
| KR | 10-0836821 B1 | 6/2008 |

*Primary Examiner* — Chen Wen Jiang
(74) *Attorney, Agent, or Firm* — Birch, Stewart, Kolasch & Birch, LLP (57) ABSTRACT

After the power source to the control substrate is turned on, power is supplied to the compressor driver and the fan driver. Then, when it is determined that an indoor unit is in operation, the compressor driver and the fan driver are operated. Meanwhile, when it is determined that the indoor unit is not in operation, after the lapse of ten minutes or twenty minutes under a predetermined setting, the power to the compressor driver and the fan driver is cut. When the operation of the indoor unit is started again, power is supplied to the compressor driver and the fan driver.

15 Claims, 7 Drawing Sheets

PRIOR ART

FIG. 7

LOAD DRIVING DEVICE, OUTDOOR UNIT OF AIR CONDITIONER, AND DRIVING METHOD OF LOAD

TECHNICAL FIELD

The present invention relates to a technique for driving a load and can be applied to a technique for driving a compressor of an outdoor unit of an air conditioner, for example.

BACKGROUND ART

Conventionally, when a load such as a compressor of an outdoor unit of an air conditioner is driven, an inverter has been used in order to control the driving in some cases. Thus, efforts to reduce standby power are made in view of power saving. In addition, there are, e.g., Patent Documents 1 to 5 as documents related to the present invention.

Patent Document 1: Japanese Patent Application Laid-Open No. 11-211253
Patent Document 2: Japanese Patent Application Laid-Open No. 11-311436
Patent Document 3: Japanese Patent Application Laid-Open No. 2000-205627
Patent Document 4: Japanese Patent Application Laid-Open No. 2000-333365
Patent Document 5: Japanese Patent Application Laid-Open No. 2000-346425

DISCLOSURE OF THE INVENTION

Problems to be Solved by the Invention

Figure 6:
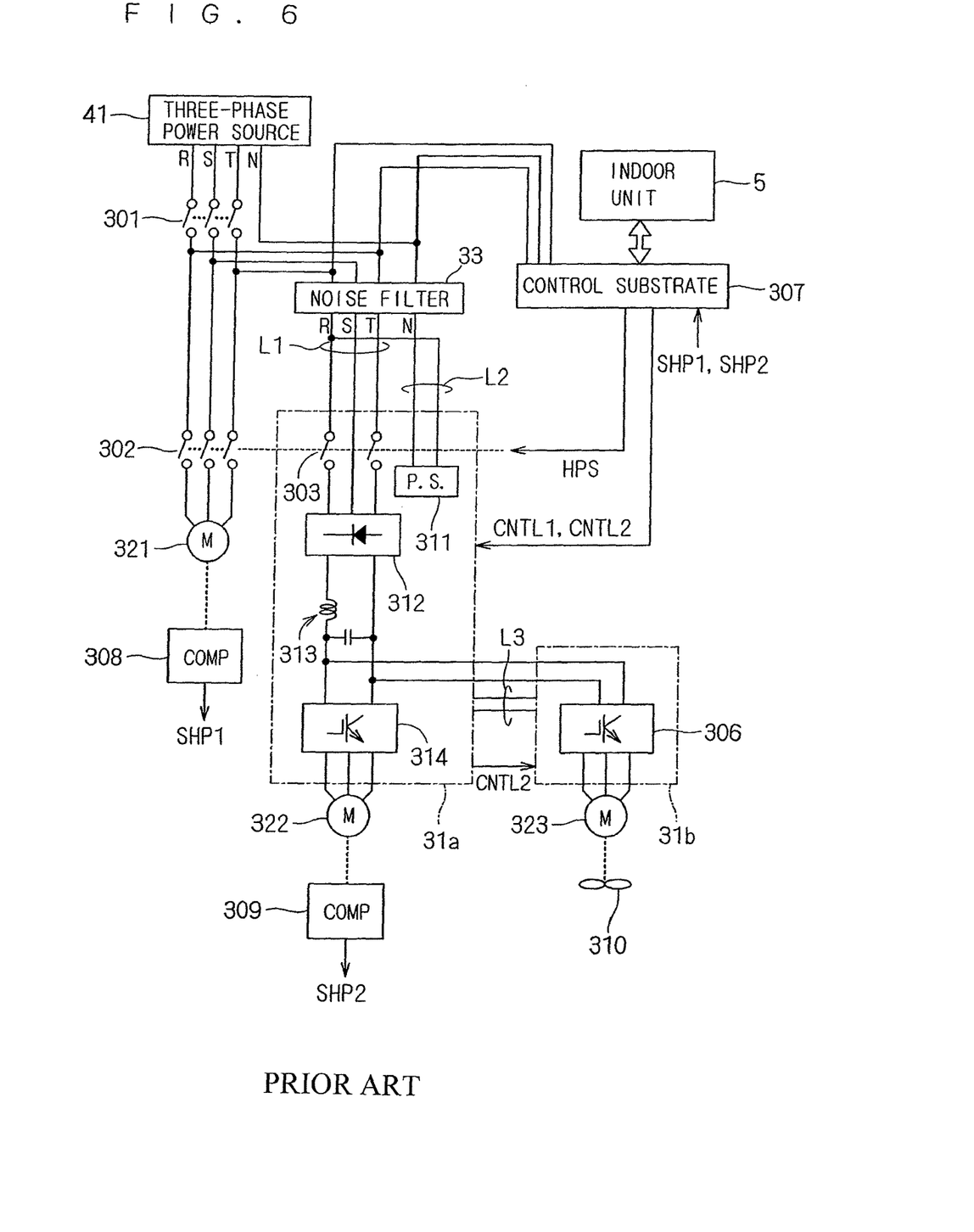
FIG. 6 is a circuit diagram showing a technique for driving a compressor.

FIG. 6 is a circuit diagram showing a technique for driving a compressor. Compressors 308 and 309 and a fan 310 are driven by motors 321, 322 and 323, respectively. Such driving is shown by a broken line in FIG. 6.

Power source lines of an R phase, an S phase, and a T phase are connected to a three-phase power source 41, and power source switches 301 are interposed in the three power source lines. The power source switch 301 has an input side connected to the three-phase power source 41 and an output side. A motor 321 is connected to the output side of the power source switch 301 through a control switch 302. Meanwhile, a motor 322 is connected to the output side of the power source switch 301 through a compressor driver 31a.

The compressor driver 31a has inverter circuits including a diode bridge 312 and a switching circuit 314. In addition, it has a filter 313 provided between them. A DC voltage from the diode bridge 312 (or further from the filter 313) is supplied to the switching circuit 314. The switching circuit 314 switches the DC voltage and supplies it to the motor 322.

In addition, although the compressor driver 31a is commonly referred to as an inverter, it is described here as a driver to be distinguished from the above inverter circuit which is used in a more strict sense.

A fan driver 31b has a switching circuit 306 that switches the above DC voltage and supplies it to the motor 323.

The compressors 308 and 309 compress a cooling medium. An air conditioner performing air conditioning with the cooling medium includes an indoor unit 5. In addition, the fan 310 cools these compressors.

A power source line of a neutral point N is also connected to the three-phase power source 41 and connected to the compressor driver 31a together with the power source lines of R phase, S phase and T phase. In order to avoid the effect of a noise on the inverter circuit, it is preferable that a noise filter 33 is provided between the output side of the power source switch 301 and the compressor driver 31a.

The power source lines of the R phase, the S phase and the T phase, and the power source lines of the R phase and the neutral point N are connected to the compressor driver 31a as a power source line group L1 and as a power source line group L2, respectively. A power source input 311 is connected to the power source line group L2 and supplied with the operating power of the compressor driver 31a. A power source line group L3 is indirectly connected to the power source line group L2 through the compressor driver 31a and supplies the operating power of the fan driver 31b to the fan driver 31b.

A control substrate 307 is connected to the power source lines of the R phase and the T phase on the output side of the power source switch 301 and also connected to the power source line of the neutral point N, and supplied with operating power from the three-phase power source 41. The control substrate 307 generates switching control commands CNTL1 and CNTL2, which control switching of the switching circuits 314 and 306, respectively.

Since the switching control command CNTL2 is given to the fan driver 31b through the compressor driver 31a once together with the switching control command CNTL1, it can be regarded as being given from the compressor driver 31a to the fan driver 31b, and it can be regarded as being given from the control substrate 307 to the compressor driver 31a. Alternatively, the switching control command CNTL2 may be given to the fan driver 31b directly without passing through the compressor driver 31a.

When the compressors 308 and 309 detect an abnormality in pressure of its compressed cooling medium, they output abnormal pressure information SHP1 and SHP2 to the control substrate 307. Although the information may be signals, the information is recognized in the control substrate 307 as connection/disconnection of the switch in general.

The control substrate 307 generates an abnormal pressure signal HPS based on the abnormal pressure information SHP1 and SHP2 to output the same. More specifically, when at least one of the abnormal pressure information SHP1 and SHP2 indicates an abnormality in pressure, the outputted abnormal pressure signal HPS is asserted.

The abnormal pressure signal HPS controls the connection/disconnection of the control switches 302 and 303. This control is shown by a broken line in FIG. 6. Since the abnormal pressure signal HPS is negated in general, the control switches 302 and 303 are connected.

Figure 7:
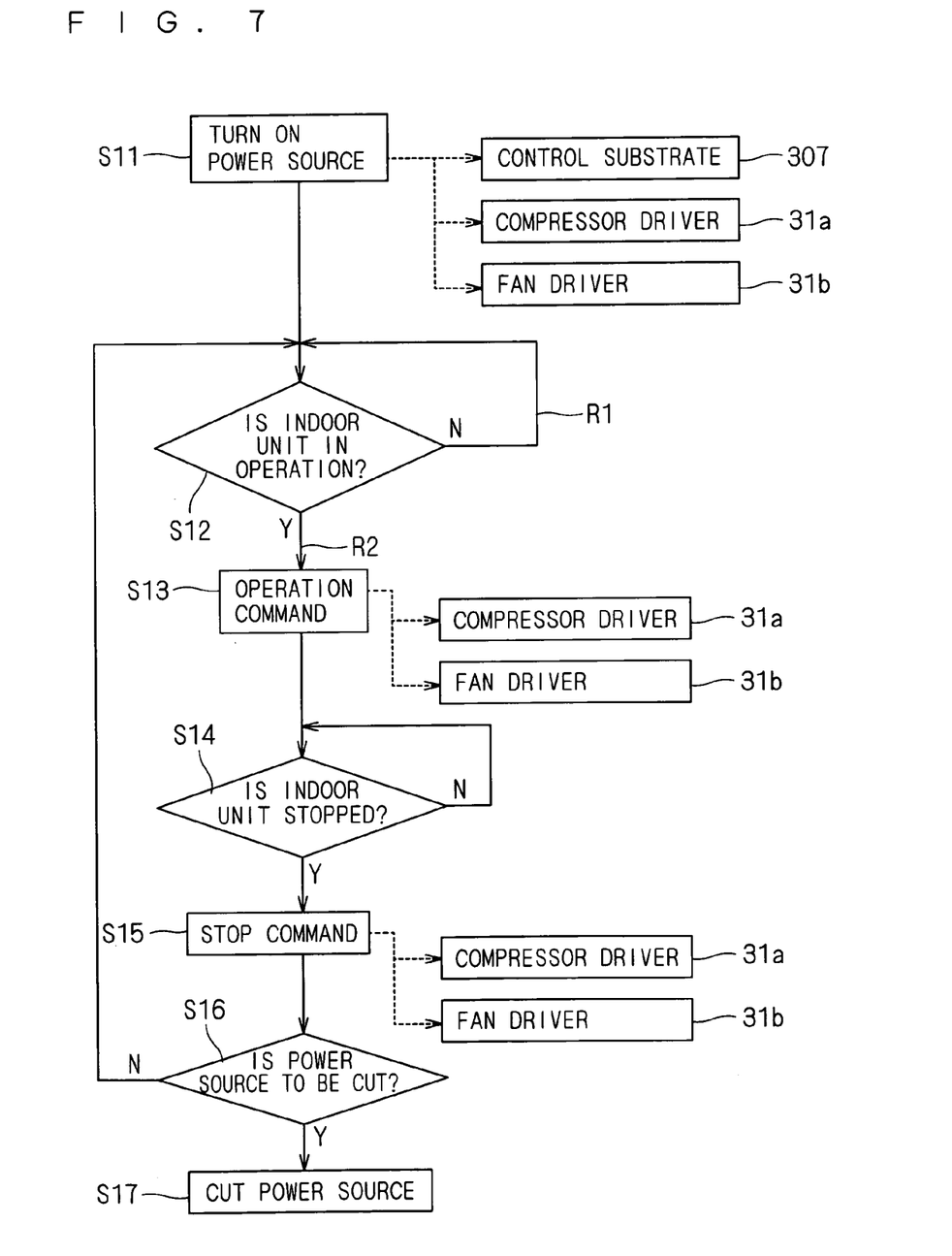
FIG. 7 is a flowchart showing an operation to reduce standby power.

FIG. 7 is a flowchart showing the operation to reduce standby power, in which the operations of the control substrate 307 are shown mainly. In this flowchart, blocks connected to blocks showing the steps, by broken lines are components that are controlled or power supplied/cut in that step.

In step S11, the power source is turned on by turning on the power source switch 301 before the operation of the control substrate 307. Thus, the operating power is supplied to the control substrate 307, the compressor driver 31a, and the motor 321. In addition, the operating power is supplied to the fan driver 31b through the diode bridge 312 and the filter 313.

Then, communication (shown by an outline arrow in FIG. 6) is performed between the control substrate 307 and the indoor unit 5, and it is determined whether the indoor unit 5 is in operation or not in step S12. When the indoor unit 5 is not in operation, the determination in step S12 is repeated through a route R1. When the indoor unit 5 is in operation, the process proceeds to step S13 through a route R2, and the operations of the compressor driver 31a and the fan driver 31b are commanded. More specifically, the control commands CNTL1 and CNTL2 are given from the control substrate 307 to the compressor driver 31*a* and the fan driver 31*b* respectively to instruct operations of the compressor driver 31*a* and the fan driver 31*b* specifically.

Then, in step S14, it is determined whether the indoor unit 5 is stopped or not. This can be determined also by the control substrate 307 based on the communication between the control substrate 307 and the indoor unit 5. When it is determined that the indoor unit 5 is stopped, the process proceeds to step S15, in which the operations of the compressor driver 31*a* and the fan driver 31*b* are stopped based on the control commands CNTL1 and CNTL2 from the control substrate 307. Thus, the operations of the compressor 309 and the fan 310 are stopped when the indoor unit 5 is stopped, whereby standby power is reduced.

Then, when it is determined that the power source is to be cut in step S16, the process proceeds to step S17 in which the power source is cut (the power source switch 301 is disconnected), and steps S12 to S15 are repeatedly carried out until it is determined that the power source is to be cut.

Since the operations of the compressor 309 and the fan 310 are stopped while the indoor unit 5 is stopped, the power supplied to the compressor driver 31*a* and the fan driver 31*b* is not needed. Thus, since this power is consumed as the standby power, the power to the compressor driver 31*a* and the fan driver 31*b* is to be also cut while the indoor unit 5 is stopped.

However, even when the operations of the compressor 309 and the fan 310 are stopped based on the stop of the indoor unit 5, in the case where it is determined that the indoor unit 5 is in operation in step S12, these operations need to be resumed in step S13. Therefore, it is not desirable that step S16 is omitted in the technique shown in FIGS. 6 and 7, so that the power supply to the compressor driver 31*a* and the fan driver 31*b* is just cut in step S17.

The present invention was made in view of the above trade-off, and it is an object of the present invention to save power of a second control circuit when the second control circuit drives a load under the control of a first control circuit.

A first aspect of a load driving device according to the present invention includes: a power source switch (301) having an input side connected to a power source (41) and an output side; a first control circuit (307) connected to the output side of the power source switch and supplied with operating power upon connection of the power source switch; a first control switch (304, 305) connected to the output side of the power source switch and connected/disconnected under a first switching command (WP) from the first control circuit; and a second control circuit (31*a*) supplied with power upon connection of both of the power source switch and the first control switch and driving a load (322, 309) under a first control command (CNTL1) from the first control circuit.

A second aspect of the load driving device according to the present invention relates to the first aspect, wherein the second control circuit (31*a*) includes an inverter circuit (312, 313, 314) generating power to be supplied to the load (322, 309) from power supplied from the power source (41). The load driving device further includes a second control switch (303) interposed between the power source switch (301) and the inverter circuit (312, 313, 314) and connected/disconnected according to normality/abnormality of the load (322, 309).

A third aspect of the load driving device according to the present invention relates to the first aspect, wherein the second control circuit (31*a*) includes: an inverter circuit (312, 313, 314) generating power to be supplied to the load (322, 309) from power supplied from the power source (41); and an inverter control circuit (316) controlling operation of the inverter circuit. The first control switch includes a switch (305) for supplying/cutting power to the inverter control circuit.

The first control switch desirably includes a switch (304) for supplying/cutting power to the inverter circuit (312, 313, 314).

A fourth aspect of the load driving device according to the present invention relates to the second or the third aspect, wherein the load includes: a first motor (322) supplied with power from the inverter circuit (312, 313, 314); and a first compressor (309) driven by the first motor and compressing a cooling medium. The first control circuit (307) generates a second switching command (HPS) to disconnect the second control switch when an abnormality in pressure occurs in the first compressor.

A fifth aspect of the load driving device according to the present invention relates to the fourth aspect, wherein the inverter circuit (312, 313, 314) includes a diode bridge (312) and a first switching circuit (314) switching a DC voltage outputted from the diode bridge and outputting the voltage to the first motor (322). The load driving device further includes a third control circuit (31*b*) having a second switching circuit (306) switching the DC voltage and outputting the voltage to a second motor (323), supplied with operating power from the second control circuit, and driving the second motor based on a second control command (CNTL2) from the first control circuit or the second control circuit.

An outdoor unit of an air conditioner according to the present invention includes: the load driving device according to the fourth or the fifth aspect; the first motor (322) and the first compressor (309); a third motor (321) connected to the output side of the power source switch (301) and supplied with operating power upon connection of the power source switch; and a second compressor (308) driven by the third motor and compressing a cooling medium.

A first aspect of a method of driving a load according to the present invention includes: (a) the step (S11*a*) of supplying operating power to a first control circuit (307); (b) the step (S11*b*) of starting to supply power to a second control circuit (31*a*) driving a load (322, 309) after the step (a); (c) the step (S222) of cutting at least part of power supplies to the second control circuit under a state where a predetermined condition (S220, S221, S223) is satisfied after the step (b); and (d) the step (S13) of driving the load by the second control circuit based on a first control command (CNTL1) obtained from the first control circuit under a state where the predetermined condition is not satisfied after the step (b).

A second aspect of the method of driving the load according to the present invention relates to the first aspect, wherein the second control circuit (31*a*) includes an inverter circuit (312, 313, 314) generating power to be supplied to the load (322, 309) under the first control command (CNTL1). The load includes: a motor (322) supplied with power from the inverter circuit (312, 313, 314); and a compressor (309) driven by the first motor and compressing a cooling medium. It is determined that the predetermined condition is satisfied in a case where an indoor unit (5) of an air conditioner performing air conditioning using the cooling medium is not in operation (S220) and the air conditioning is selected in a predetermined setting throughout a period that a first time elapses after the step (b) (S221).

A third aspect of the method of driving the load according to the present invention relates to the second aspect, wherein the predetermined setting includes a case where the air conditioning is in a blowing operation.

A fourth aspect of the method of driving the load according to the present invention relates to the second or the third aspect, wherein the predetermined setting includes a case where the air conditioning is in a cooling operation under a state that an ambient temperature is lower than a first temperature.

A fifth aspect of the method of driving the load according to the present invention, wherein the predetermined setting includes a case where the air conditioning is in a warming operation under a state that an ambient temperature is higher than a second temperature.

A sixth aspect of the method of driving the load according to the present invention relates to any one of the second to the fifth aspects, wherein it is determined that the predetermined condition is satisfied in a case where the indoor unit (5) is not in operation (S220) and also a second time longer than the first time has elapsed from the step (b) (S223).

A seventh aspect of the method of driving the load according to the present invention relates to the first aspect, wherein the second control circuit (31a) includes: an inverter circuit (312, 313, 314) generating power to be supplied to the load (322, 309) under the first control command (CNTL1); and an inverter control circuit (316) controlling operation of the inverter circuit. The load includes: a motor (322) supplied with power from the inverter circuit (312, 313, 314); and a compressor (309) driven by the first motor and compressing a cooling medium. It is determined that the predetermined condition is satisfied in a case where a time during which the inverter circuit is not controlled continues for a predetermined period or more, and the power supply to the inverter control circuit is cut while the power supply to the inverter circuit is kept in the step (c).

An eighth aspect of the method of driving the load according to the present invention relates to any one of the second to the seventh aspects, further including: (e) the step (S15) of stopping drive of said load which is driven by said second control circuit when operation of the indoor unit (5) is stopped (S14) after the step (d). The step (c) or the step (d) is carried out again except in a case where both of supplies of operating power to the first control circuit (101) and the operating power to the second control circuit (31a) are stopped (S16, S17) after the step (e).

Effects of the Invention

According to the first aspect of the load driving device in the present invention, since the operating power to the second control circuit is supplied/cut based on the connection/disconnection of the first control switch, power saving can be implemented while the operating power is kept supplied to the first control circuit.

According to the second aspect of the load driving device in the present invention, the power supply to the inverter circuit is cut when the load becomes abnormal regardless of the power saving operation, and the abnormal situation is managed.

According to the third aspect of the load driving device in the present invention, since the operating power to the inverter control circuit is supplied/cut based on the connection/disconnection of the first control switch, the power saving can be implemented while the operating power is kept supplied to the first control circuit.

According to the fourth aspect of the load driving device in the present invention, when an abnormality in pressure occurs in the first compressor, the power supply to the inverter circuit is cut and the abnormal pressure of the cooling medium is managed.

According to the fifth aspect of the load driving device in the present invention, the operating power to the third control circuit is also cut as to the second control circuit, to contribute to the power saving.

With the outdoor unit according to the present invention, even when the first compressor is stopped based on the disconnection of the first control switch to implement the power saving, the cooling medium can be compressed by the second compressor to some extent.

According to the first aspect of the driving method of the load in the present invention, since the operating power to the second control circuit can be supplied/cut separately from the supply of the operating power to the first control circuit, the power saving can be implemented.

According to the second aspect of the driving method of the load in the present invention, since necessity to compress the cooling medium is low depending on the setting of the air conditioning in some cases, the operating power to the second control circuit is cut by executing the step (c) in this case, whereby the power consumption is reduced.

According to the third aspect of the driving method of the load in the present invention, even when the indoor unit is in operation, in the case where the air conditioning is a blowing, since it is not necessary to compress the cooling medium, the operating power to the second control circuit is cut by executing the step (c), whereby the power consumption is reduced.

According to the fourth aspect of the driving method of the load in the present invention, when the cooling operation is selected under the circumstances where the ambient temperature is low, since necessity to compress the cooling medium previously before the operation of the indoor unit is low, the operating power to the second control circuit is cut by executing the step (c), whereby the power consumption is reduced.

According to the fifth aspect of the driving method of the load in the present invention, when the warming operation is selected under the circumstances where the ambient temperature is high, since necessity to compress the cooling medium previously before the operation of the indoor unit is low, the operating power to the second control circuit is cut by executing the step (c), whereby the power consumption is reduced.

According to the sixth aspect of the driving method of the load in the present invention, when the condition where the indoor unit is not in operation continues for a long time, the operating power to the second control circuit is cut by executing the step (c), whereby the power consumption is reduced.

According to the seventh aspect of the driving method of the load in the present invention, since necessity to compress the cooling medium is low depending on the setting of the air conditioning in some cases, the operating power to the inverter control circuit is cut by executing the step (c), whereby the power consumption is reduced.

According to the eighth aspect of the driving method of the load in the present invention, a predetermined condition is determined anew when the indoor unit is stopped, and the power saving flow is executed.

Other objects, characteristics, aspects, and advantages of the present invention will become apparent through the following detailed description and the accompanying drawings.

BEST MODE FOR CARRYING OUT THE INVENTION

Figure 1:
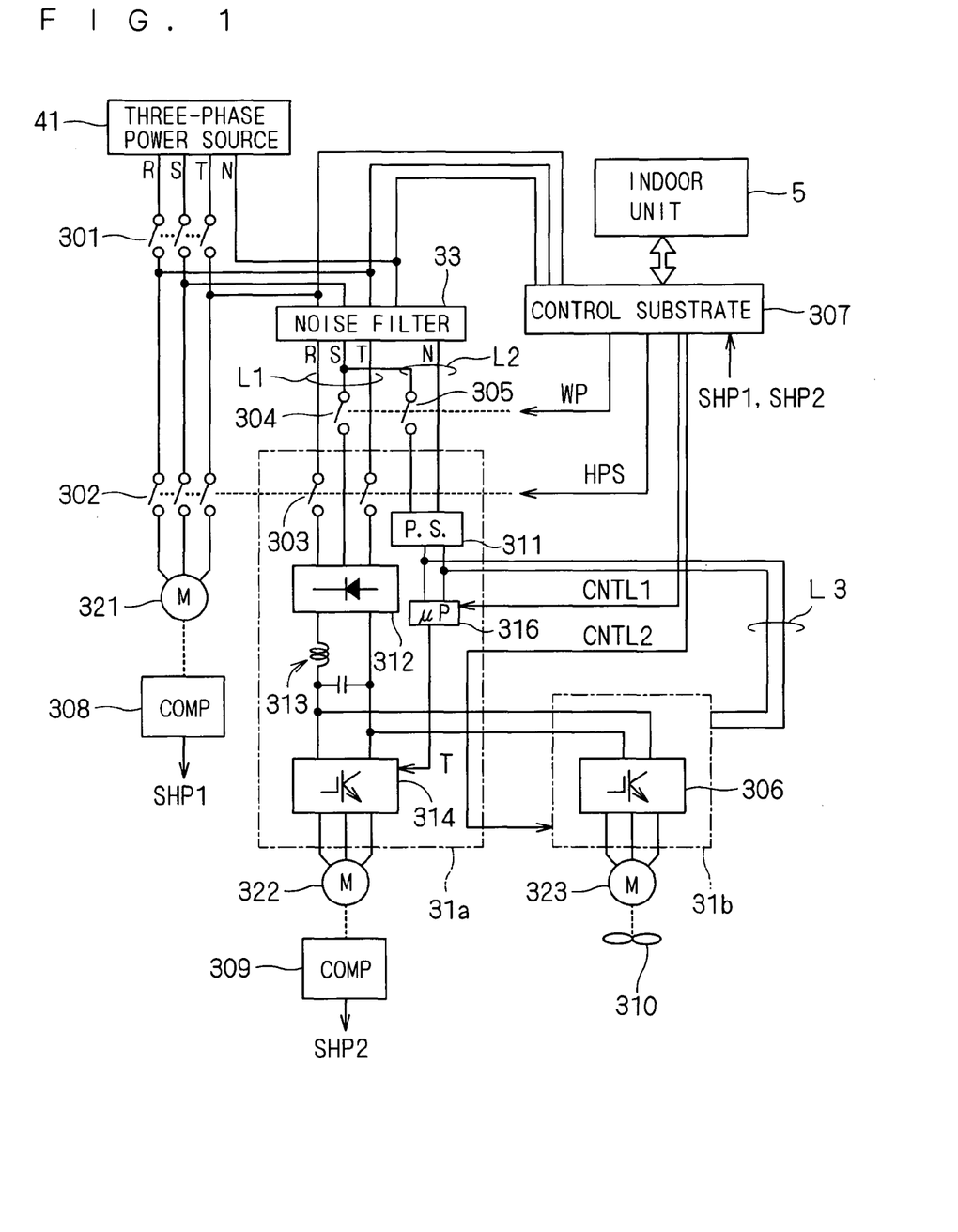
FIG. 1 is a circuit diagram illustrating a constitution according to an embodiment of the present invention.

FIG. 1 is a circuit diagram illustrating the constitution of an embodiment of the present invention. The same reference numerals are allotted to the same components in the constitutions shown in FIGS. 1 and 6.

Differences from the constitution in FIG. 6 are that a control switch 305 that is connected to the output side of a power source switch 301 and performs connection/disconnection based on a switching command WP is provided and the switching command WP is outputted from a control substrate 307.

More specifically, the control switch 305 exists between a noise filter 33 and a power source input 311 in a compressor driver 31a to supply/cut power to the compressor driver 31a.

It is to be noted that power source lines of a neutral point N and an S phase are used as a power source line group L2 connected to the power source input 311 in the compressor driver 31a, and that the connection/disconnection of the power source line of the S phase, which is one of the power source line group L2 is implemented by the control switch 305 in the constitution according to the present embodiment.

As the power source line group L2, the power source lines of an R phase and the neutral point N may also be used in the present embodiment.

A control switch 304 is interposed in the S-phase power source line, and connecting/disconnecting thereof is controlled by the switching command WP. The control switches 304 and 305 are interposed in the S-phase power source line between a three-phase power source 41 and the compressor driver 31a, and every connecting/disconnecting thereof is controlled by the switching command WP similarly. Therefore, they can be put together as one control switch on the side closer to the three-phase power source 41 than splitting into the power source line groups L1 and L2.

In addition, according to the present embodiment, the operating power of the compressor driver 31a provided from the power source input 311 will be described in detail. The power source input 311 supplies power to a microprocessor 316, and the microprocessor 316 generates a switching command T based on a switching control command CNTL1. The microprocessor 316 outputs the switching command T to a switching circuit 314 to control the switching operation thereof and functions as an inverter control circuit for controlling an inverter circuit including the switching circuit 314. A switching control command CNTL2 goes through the compressor driver 31a but it just passes through it substantially. The microprocessor 316 is shown including a rectification circuit and a constant-voltage circuit required for its operation.

Figure 2:
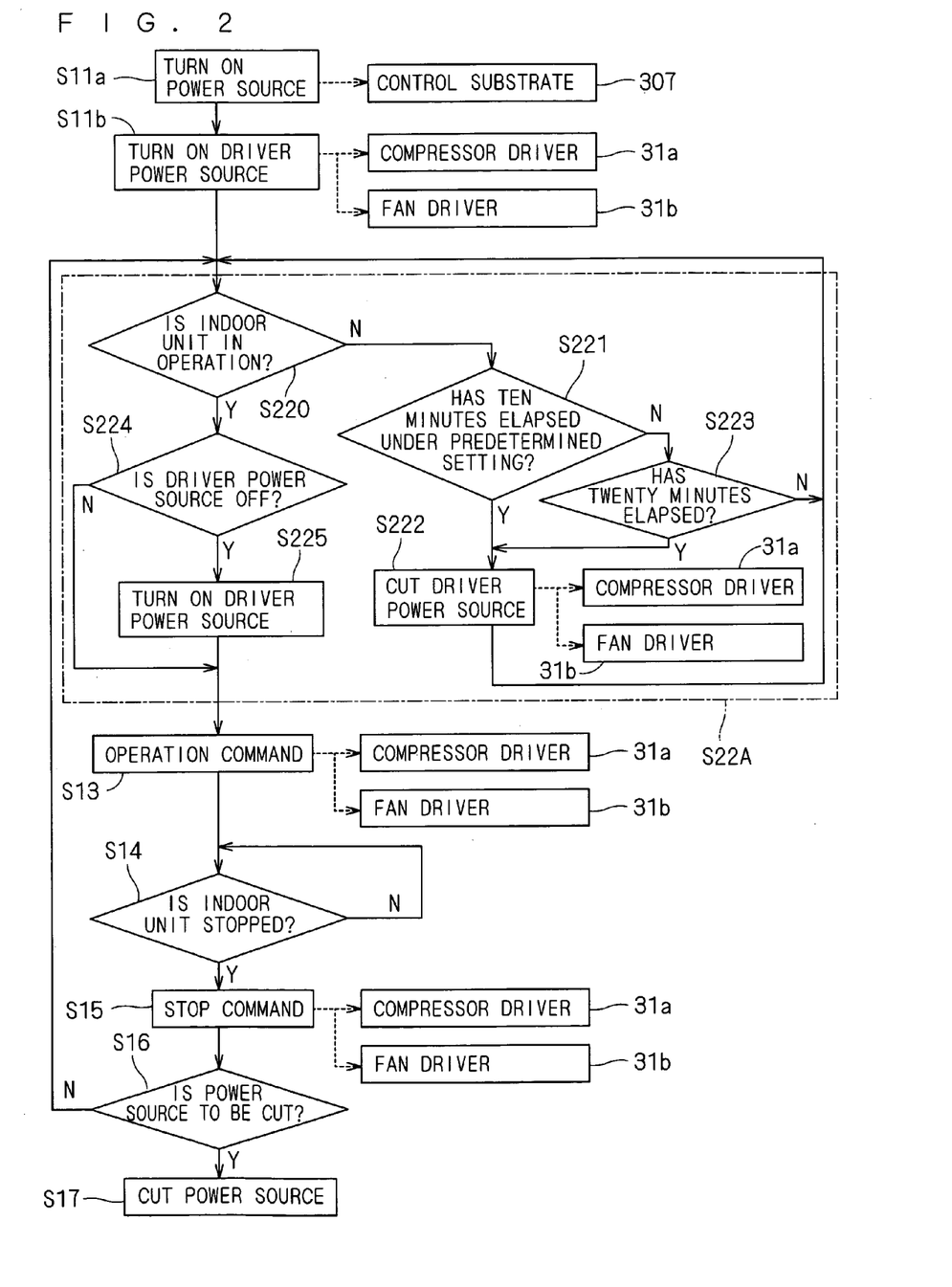
FIG. 2 is a flowchart showing operations according to the embodiment.

FIG. 2 is a flowchart showing the operation to reduce standby power in the present embodiment, in which step S11 in the flowchart shown in FIG. 7 is separated into steps S11a and S11b, and step S12 is replaced with step S22A.

The power source switch 301 is conducted first in step S11a. At this time, the control switches 304 and 305 are not connected, and the power is not supplied to the compressor driver 31a and a fan driver 31b.

When step S11a is carried out, operating power is supplied to a control substrate 307 and the control substrate 307 communicates with an indoor unit 5 (as shown by an outline arrow in FIG. 1). Then, the process proceeds to step S11b in which the power is supplied to the compressor driver 31a and the fan driver 31b. More specifically, the control signal WP is asserted, and the control switches 304 and 305 are switched from the disconnection state to the connection state. Being the control switch 305 connected, the operating power of the compressor driver 31a is supplied from the power source line group L2 to the power source input 311. Accordingly, the operating power of the fan driver 31b is supplied from a power source line group L3. In addition, a control switch 303 is connected in general, and together with the control switch 304, the R-phase, S-phase and T-phase powers are supplied from the power source line group L1 to the compressor driver 31a. Then, the process proceeds to step S22A.

Step S22A includes steps S220 to S225. First, in step S220, it is determined whether the indoor unit 5 is in operation or not as in step S12. When the indoor unit 5 is in operation, it is determined whether the operating power to the compressor driver 31a and accordingly the fan driver 31b is cut or not in step S224. When it is cut, the operating power is supplied in step S225 (connection in the control switches 304 and 305 by asserting the control signal WP).

When the above operating power is not cut, for example, when the determination is made in step S220 just after the process in step S11b is carried out, step S225 is not carried out, and the process proceeds from step S224 to step S13. The operations in steps S13 to S16 have been already described.

After step S11b is carried out, under the condition where a predetermined condition is satisfied, the control signal WP is negated to disconnect the control switches 304 and 305, and the power driving a motor 322, the operating power of the compressor driver 31a itself, and the operating power of the fan driver 31b are cut (in S222). In other words, when the predetermined condition is not satisfied, the process proceeds to step S13 in which the compressor driver 31a and the fan driver 31b drive the motors 322 and 323 to drive a compressor 309 and a fan 310 based on the control commands CNTL1 and CNTL2.

The case where it is determined that the above predetermined condition is satisfied includes a case where the indoor unit 5 is not in operation (S220) and air conditioning is selected in a predetermined setting throughout a first time (ten minutes, for example) after the step S11b. This predetermined setting is exemplified for the following cases (i) to (iii):

(i) The air conditioning is in a blowing operation;

(ii) The air conditioning is in a cool operation in an ambient temperature lower than a first temperature (30° C., for example); and (iii) The air conditioning is in a warm operation in an ambient temperature higher than a second temperature (10° C., for example).

Once the indoor unit 5 is not operated, and then even when the indoor unit 5 operates, in the case where the air conditioning is in the blowing like the case (i), it is not necessary to compress a cooling medium. In addition, according to the cases (ii) and (iii), even when the indoor unit 5 is in operation after the determination in step S220, the cooling ability and the warming ability required at this time are low. While the indoor unit 5 is in a standby state in which it is not in operation, the need for compressing the cooling medium is low. Thus, when the air conditioning is set in one of the above cases (i), (ii), and (iii) throughout the first time (ten minutes, for example) after step S11b, the power for driving the motor 322, the operating power of the compressor driver 31a itself, and the operating power of the fan driver 31b are cut, whereby the power consumption is reduced.

In addition, even when the air conditioning is not set in one of the above cases (i), (ii), and (iii), or even when it is set in one of them, in the case where the period thereof is shorter than the first time, the process proceeds from step S221 to step S223.

In step S223, it is determined whether a second time (twenty minutes, for example) has elapsed after step S11b. When the second time has not elapsed, the process returns to step S220. Meanwhile, when the second time has elapsed, the process proceeds to step S222 in which the power for driving the motor 322, the operating power of the compressor driver 31a itself, and the operating power of the fan driver 31b are cut.

Even when the air conditioning is not set in one of the above cases (i), (ii), and (iii) (that is, even when it is desirable to compress the cooling medium previously for the subsequent operation of the indoor unit 5), in the case where the indoor unit 5 is not in operation for a long time, the power for driving the motor 322, the operating power of the compressor driver 31a itself, and the operating power of the fan driver 31b are cut.

It is desirable that the second time is longer than the first time. This is because when the second time is equal to the first time or shorter, even when the air conditioning is set in one of the above cases (i), (ii), and (iii) in step S221, it is not determined whether the setting is continued for the first time or not.

Thus, when the power for driving the motor 322, the operating power of the compressor driver 31a itself, and the operating power of the fan driver 31b are cut in step S222, the process returns to step S220. Then, it is determined whether the indoor unit 5 is in operation or not again.

Thus, when it is determined that the indoor unit 5 out of operation once is in operation, the process proceeds to step S225 through step S224, in which the power for driving the motor 322, the operating power of the compressor driver 31a itself, and the operating power of the fan driver 31b are supplied. When it is determined that the indoor unit 5 is not in operation, steps S221 to S223 for the power saving are carried out again.

Thus, the power for driving the motor 322 is supplied/cut by the connection/disconnection of the control switch 304, and the operating power of the compressor driver 31a itself and the operating power of the fan driver 31b are supplied/cut by the connection/disconnection of the control switch 305. Thus, while the operating power is supplied to the control substrate 307, the power saving can be implemented. In addition, since the operating power is supplied to the control substrate 307, the operating power can be supplied to the compressor driver 31a and the fan driver 31b again by asserting the switching command WP. The operation control of the control switch 305 based on the switching command WP is shown by a broken line in FIG. 1.

The control switch 304 is a preferable component in view of the power saving of the power for driving the motor 322, and the control switch 305 is a preferable component in view of the power saving of the operating power of the compressor driver 31a itself (and the operating power of the fan driver 31) required when the motor 322 is driven. However, the power for driving the motor 322 is transformed by the inverter circuit in the compressor driver 31a. Therefore, one or both of the control switches 304 and 305 can be regarded as the preferable component in view of the power saving of the power supplied to the compressor driver 31a.

Also, the control switches 302 and 303 are provided, and they are disconnected when an abnormal pressure signal HPS is asserted. According to the above operation, when an abnormality in pressure occurs in the compressors 308 and 309, the power supply to the inverter circuit is cut, and the abnormal situation is managed regardless of the power saving. The operation control of the control switches 302 and 303 by the abnormal pressure signal HPS is shown by a dotted line.

When the abnormal pressure signal HPS is asserted, the control switch 302 is also disconnected, the power to the motor 321 is cut and the compressor 308 is stopped. When any one of an abnormal pressure signal SHP1 from the compressor 308 and an abnormal pressure signal SHP2 from the compressor 309 is asserted, then the abnormal pressure signal HPS is asserted. Therefore, even when an abnormality occurs in the compressor 308, not only the control switch 302 but also the control switch 303 are disconnected to stop the compressor 309. As a matter of course, the compressor 308 is not necessarily provided in the present invention.

In addition, when the control switch 303, and the control switches 305 and 304 are separately provided, the present invention can be applied not only to the case where the three-phase power source 41 has the neutral point N, but also to the case where the three-phase power source has no neutral point, keeping the constitution of the compressor driver 31a.

Further, since the compressor 308 driven by the motor 321 is provided, even when the control switch 305 is disconnected and the compressor 309 is stopped to carry out the power saving, the cooling medium can be compressed by the compressor 308 to some extent. Thus, an outdoor unit having the compressors 308 and 309, the motors 321 and 322 for driving those, the control substrate 307 and the compressor driver 31a is preferable from the perspective that it can be in operation while saving the power. As a matter of course, the fan driver 31b, the motor 323, and the fan 310 are preferably provided.

It is not necessary to provide the control switch 304 in the above embodiment. When the driver power source is cut in step S222, all the power supplies to the compressor driver 31a may not cut but at least part of them may be cut. More specifically, for instance, the operating power of the compressor driver 31a itself may be cut by the switch 305 alone without cutting the power for driving the motor 322.

Figure 3:
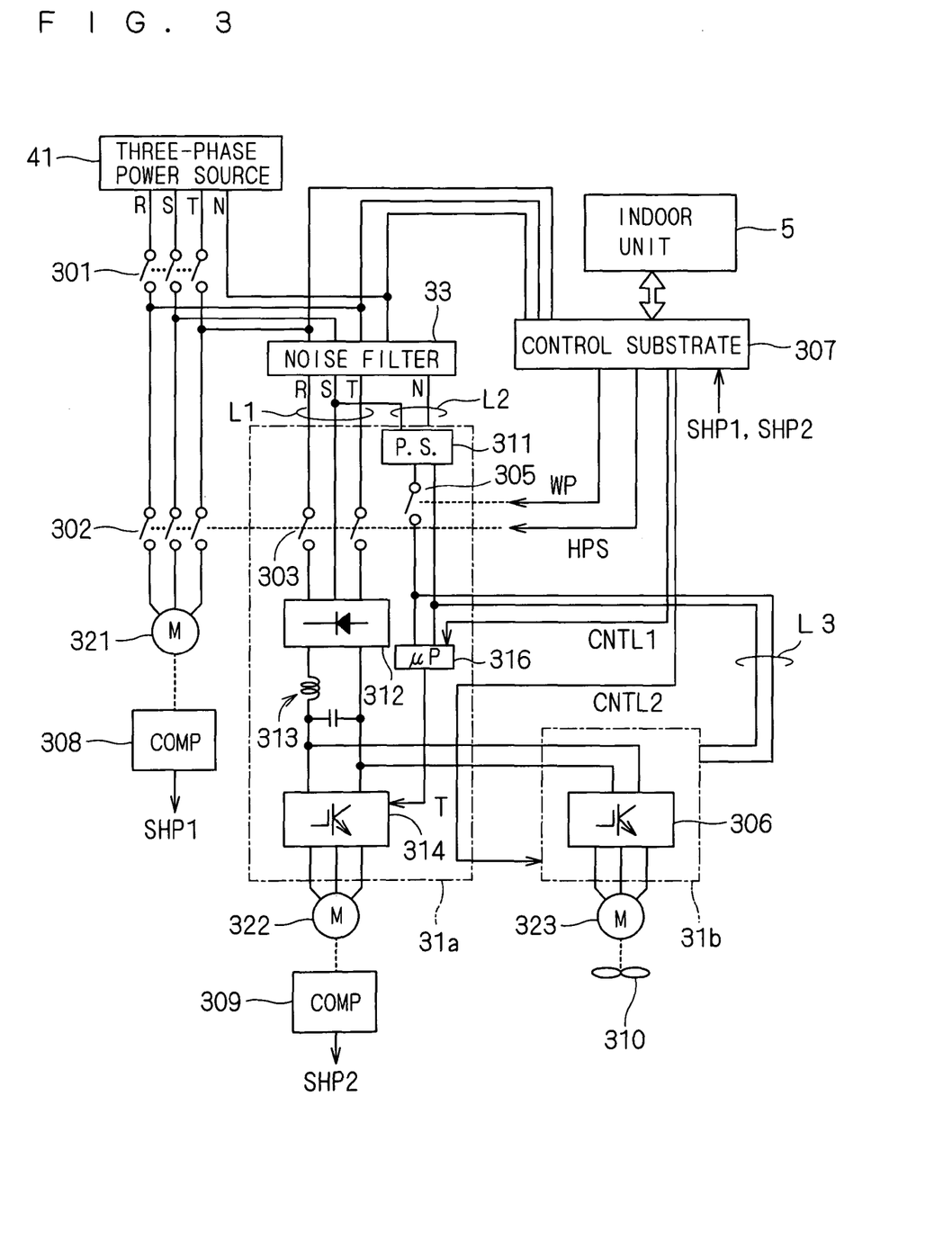
FIG. 3 is a circuit diagram illustrating a constitution according to a variation of the embodiment.

FIG. 3 is a circuit diagram illustrating the constitution of such variation. The control switch 304 is shorted from the constitution shown in FIG. 1, and a wiring group L1 is not cut by a switching command WP. The switching command WP only controls the switching of a control switch 305.

Note that, in this example, a case where the control switch 305 is provided closer to a microprocessor 316 than a power source input 311 is shown, and the power supply to the microprocessor 316 is cut by disconnecting the control switch 305. In addition, a wiring group L3 is drawn from a side further from the power source input 311 than the control switch 305, and the supply/cut of the power to the wiring group L3 is depend on the switching of the control switch 305. However, as another constitution, the wiring group L3 may be drawn from a part closer to the power source input 311 than the control switch 305, and the supply/cut of the power to the wiring group L3 may not depend on the switching of the control switch 305. A compressor driver 31a and a fan driver 31b may be mounted on the same substrate as a control substrate 307.

The operation along the flowchart shown in FIG. 2 may be performed for the constitution shown in FIG. 3. Alternatively, the operation along the following flowchart may be performed therefor.

Figure 4:
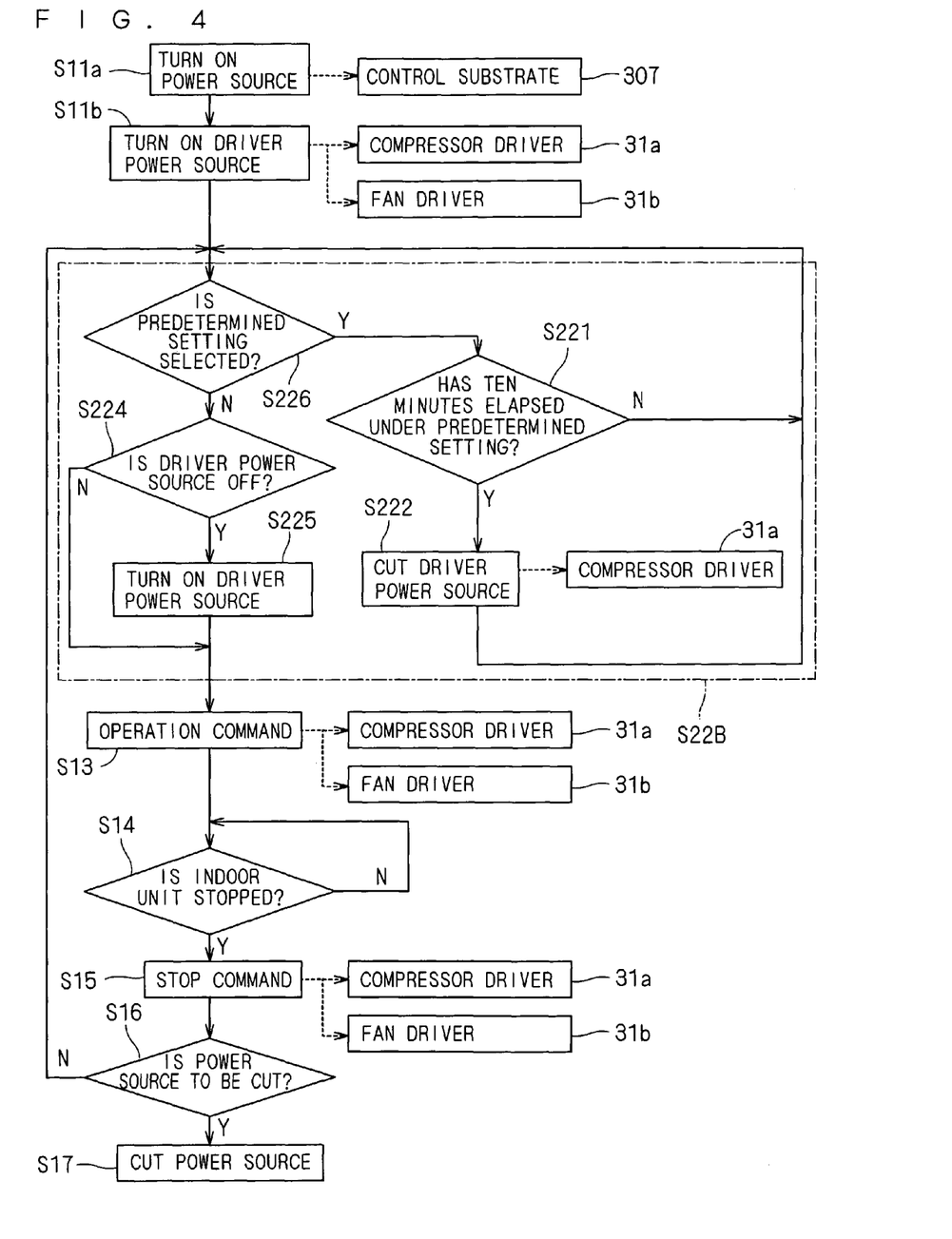
FIG. 4 is a flowchart showing operations according to the variation of the embodiment.

FIG. 4 is a flowchart showing the operations to reduce power in the constitution shown in FIG. 3, in which step S22A in the flowchart shown in FIG. 2 is replaced with step S22B.

According to step S22B, step S220 of step S22A is replaced with step S226, and step S223 is removed. More specifically, unless it is determined that ten minutes have elapsed under a predetermined setting in step S221, the process returns to step S226.

According to step S226, similar to step S221, it is determined whether the predetermined setting is made or not. The predetermined setting in these steps employs the setting that an inverter circuit is not controlled. Thus, it is determined whether a time during which the inverter circuit is not controlled has continued more than ten minutes or not in steps S221 and S226. When the determination is affirmative, the process proceeds to step S222 and when the determination is negative, the process proceeds to step S224.

Since the control switch 304 is not provided in FIG. 3, the power supply to a switching circuit 306 of a fan driver 31b is not cut in step S222 shown in FIG. 4. Thus, the power supply cut of the fan driver 31b is not shown in step S222 shown in FIG. 4 unlike step S222 shown in FIG. 3. Although the power supply to the wiring group L3 is cut, the power source to the wiring group L3 may not be cut as described above.

The setting that the inverter circuit is not controlled includes the following cases:

(iv) A mode to reduce standby power is selected;

(v) A ventilation or a blowing operation is selected, for example in which it is not necessary to compress a cooling medium; and (vi) There is no request to control the inverter circuit from other than the indoor unit 5, for example, such as an inspection system.

When the setting is contrary to any one of the above cases (iv) to (vi), the process proceeds from step S226 to step S224.

Figure 5:
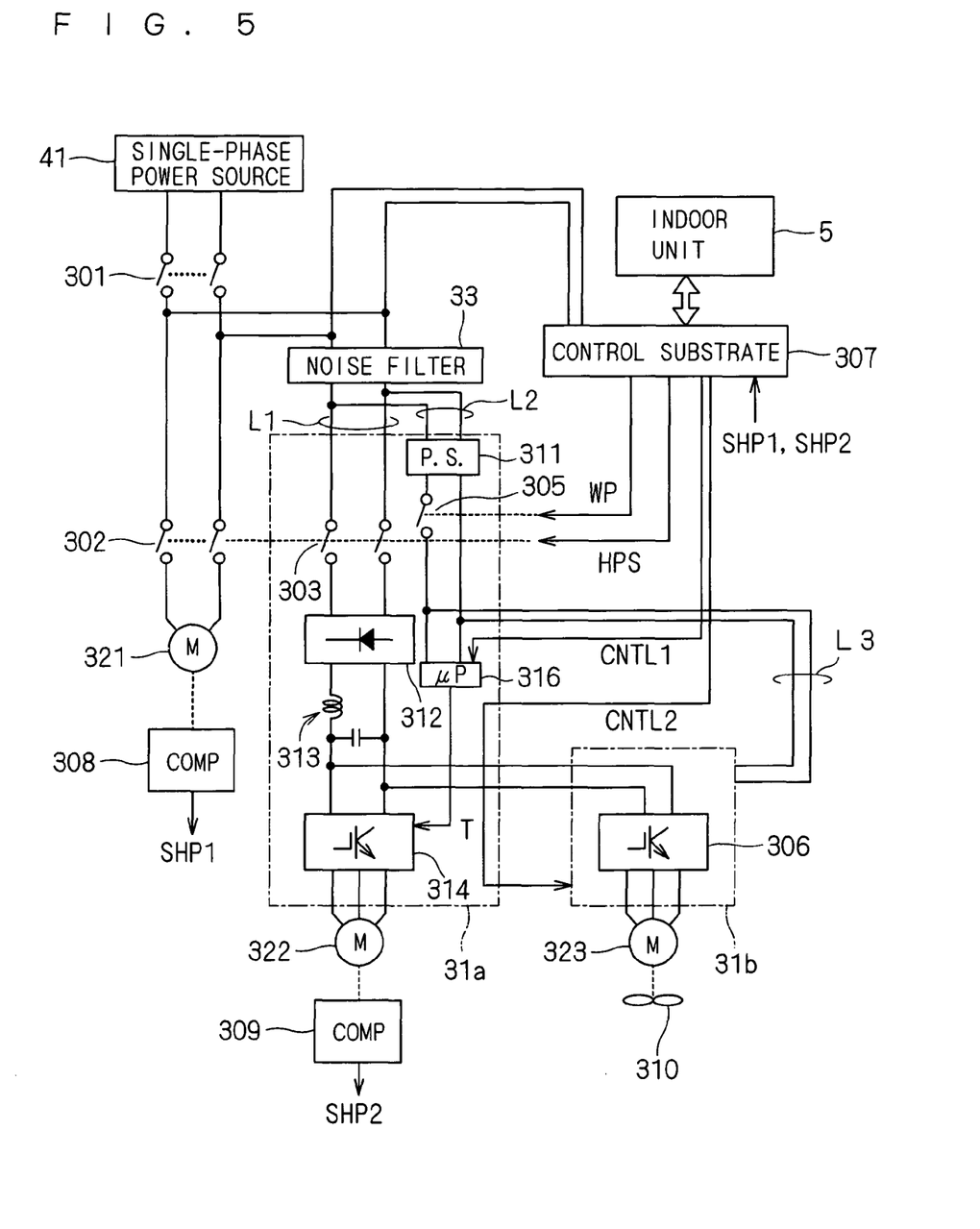
FIG. 5 is a circuit diagram illustrating a constitution according to a variation of the embodiment.

FIG. 5 is a circuit diagram illustrating the case where the constitution shown in FIG. 3 includes a single-phase power source. The three-phase power source 41 is replaced with a single-phase power source 41, the power source switch 301, the control switch 302, and the motor 321 are replaced with those for the single phase. In addition, a wiring group L2 does not contain three lines but two lines. Thus, it is clear that the present invention can be applied to the single-phase power source.

In general, the indoor unit 5 may communicate with the microprocessor 316 through the control substrate 307. In this case, for example, it is determined whether the communication is correct or not appropriately. However, it is to be noted that this determination is not made when the control switch 305 is disconnected in step S222 shown in FIGS. 2 and 4. This is because the microprocessor 316 is not in operation in that case. Thus, that determination is made after step S225, and it is preferable that the above communication is reattempted from the initial operation, for example, the operation when the power source is turned on.

Although the present invention have been described in detail, the foregoing description is given by way of example in all the aspects, and the present invention is not limited thereto. It should be understood that numerous kinds of other modifications and variations will be conceivable without departing from the scope of the present invention.

The invention claimed is:

1. A load driving device comprising:
a power source switch having an input side connected to a power source and an output side;
a first control circuit connected to said output side of said power source switch and supplied with operating power upon connection of said power source switch;
a first control switch connected to said output side of said power source switch and connected/disconnected under a first switching command from said first control circuit; and
a second control circuit supplied with power upon connection of both of said power source switch and said first control switch and driving a load under a first control command from said first control circuit, wherein
said second control circuit includes an inverter circuit generating power to be supplied to said load from power supplied from said power source, and
the load driving device further includes a second control switch interposed between said power source switch and said inverter circuit and connected/disconnected according to normality/abnormality of said load.

2. The load driving device according to claim 1, wherein said load includes:
a first motor supplied with power from said inverter circuit; and
a first compressor driven by said first motor and compressing a cooling medium, and
said first control circuit generates a second switching command to disconnect said second control switch when an abnormality in pressure occurs in said first compressor.

3. The load driving device according to claim 2, wherein said inverter circuit includes a diode bridge and a first switching circuit switching a DC voltage outputted from said diode bridge and outputting said voltage to said first motor, and
the load driving device further comprises a third control circuit having a second switching circuit switching said DC voltage and outputting said voltage to a second motor, supplied with operating power from said second control circuit, and driving said second motor based on a second control command from said first control circuit or said second control circuit.

4. An outdoor unit of an air conditioner comprising:
the load driving device according to claim 2;
said first motor and said first compressor;
a third motor connected to said output side of said power source switch and supplied with operating power upon connection of said power source switch; and
a second compressor driven by said third motor and compressing a cooling medium.

5. A load driving device comprising:
a power source switch having an input side connected to a power source and an output side;
a first control circuit connected to said output side of said power source switch and supplied with operating power upon connection of said power source switch;
a first control switch connected to said output side of said power source switch and connected/disconnected under a first switching command from said first control circuit; and
a second control circuit supplied with power upon connection of both of said power source switch and said first control switch and driving a load under a first control command from said first control circuit, wherein
said second control circuit includes:
an inverter circuit generating power to be supplied to said load from power supplied from said power source; and
an inverter control circuit controlling operation of said inverter circuit, and
said first control switch includes a switch for supplying/cutting power to said inverter control circuit.

6. The load driving device according to claim 5, wherein said first control switch includes a switch for supplying/cutting power to said inverter circuit.

7. A method of driving a load comprising:
(a) the step of supplying operating power to a first control circuit;
(b) the step of starting to supply power to a second control circuit driving a load after said step (a);
(c) the step of cutting at least part of power supplies to said second control circuit under a state where a predetermined condition is satisfied after said step (b); and
(d) the step of driving said load by said second control circuit based on a first control command obtained from said first control circuit under a state where said predetermined condition is not satisfied after said step (b), wherein
said second control circuit includes an inverter circuit generating power to be supplied to said load under said first control command,
said load includes:
a motor supplied with power from said inverter circuit; and
a compressor driven by said first motor and compressing a cooling medium, and
it is determined that said predetermined condition is satisfied in a case where an indoor unit of an air conditioner performing air conditioning using said cooling medium is not in operation and said air conditioning is selected in a predetermined setting throughout a period that a first time elapses after said step (b).

8. The method of driving the load according to claim 7, wherein
said predetermined setting includes a case where said air conditioning is in a blowing operation.

9. The method of driving the load according to claim 7, wherein
said predetermined setting includes a case where said air conditioning is in a cooling operation under a state that an ambient temperature is lower than a first temperature.

10. The method of driving the load according to claim 7, wherein
said predetermined setting includes a case where said air conditioning is in a warming operation under a state that an ambient temperature is higher than a second temperature.

11. The method of driving the load according to claim 7, wherein
it is determined that said predetermined condition is satisfied in a case where said indoor unit is not in operation and also a second time longer than said first time has elapsed from said step (b).

12. The method of driving the load according to claim 11, further comprising:
(e) the step of stopping drive of said load which is driven by said second control circuit when operation of said indoor unit is stopped after said step (d), wherein
said step (c) or said step (d) is carried out again except in a case where both of supplies of operating power to said first control circuit and the operating power to said second control circuit are stopped after said step (e).

13. The method of driving the load according to claim 7, further comprising:
(e) the step of stopping drive of said load which is driven by said second control circuit when operation of said indoor unit is stopped after said step (d), wherein
said step (c) or said step (d) is carried out again except in a case where both of supplies of operating power to said first control circuit and the operating power to said second control circuit are stopped after said step (e).

14. A method of driving a load comprising:
(a) the step of supplying operating power to a first control circuit;
(b) the step of starting to supply power to a second control circuit driving a load after said step (a);
(c) the step of cutting at least part of power supplies to said second control circuit under a state where a predetermined condition is satisfied after said step (b); and
(d) the step of driving said load by said second control circuit based on a first control command obtained from said first control circuit under a state where said predetermined condition is not satisfied after said step (b), wherein
said second control circuit includes:
an inverter circuit generating power to be supplied to said load under said first control command; and
an inverter control circuit controlling operation of said inverter circuit, and
said load includes:
a motor supplied with power from said inverter circuit; and
a compressor driven by said first motor and compressing a cooling medium, and
it is determined that said predetermined condition is satisfied in a case where a time during which said inverter circuit is not controlled continues for a predetermined period or more, and
power supply to said inverter control circuit is cut while power supply to said inverter circuit is kept in said step (c).

15. The method of driving the load according to claim 14, further comprising:
(e) the step of stopping drive of said load which is driven by said second control circuit when operation of said indoor unit is stopped after said step (d), wherein
said step (c) or said step (d) is carried out again except in a case where both of supplies of operating power to said first control circuit and the operating power to said second control circuit are stopped after said step (e).

* * * * *